United States Patent [19]

Stanley

[11] Patent Number: 4,507,947
[45] Date of Patent: Apr. 2, 1985

[54] PUNCH AND WINDING MACHINE

[75] Inventor: Louis Stanley, Peakhurst Heights

[73] Assignee: Card-O-Matic Pty. Limited, Sydney

[21] Appl. No.: 518,137

[22] Filed: Jul. 28, 1983

[30] Foreign Application Priority Data

Aug. 4, 1982 [AU] Australia .............................. PF5208
Oct. 21, 1982 [AU] Australia .............................. PF6450
Dec. 23, 1982 [AU] Australia .............................. PF7432
Mar. 31, 1983 [AU] Australia .............................. PF8709

[51] Int. Cl.³ ...................... H02K 15/02; B21D 53/00
[52] U.S. Cl. ........................................ 72/130; 29/513;
29/564.2; 29/564.7; 29/596; 29/605; 29/609;
29/736; 29/738; 72/132; 242/78.1; 242/172
[58] Field of Search ................. 29/596, 598, 605, 609,
29/513, 564.1, 564.2, 564.6, 564.7, 564.8, 732,
736, 738; 72/146, 148, 132, 130; 242/78.1, 172

[56] References Cited

U.S. PATENT DOCUMENTS 2,282,854  5/1942  Driftmeyer ...................... 29/605 X
4,320,645  3/1982  Stanley .............................. 72/148 X Primary Examiner—Carl E. Hall
Attorney, Agent, or Firm—Ladas & Parry

[57] ABSTRACT

An axial flux induction electric motor and method and apparatus for the production thereof, said motor having a rotor and stator, each formed of a core consisting of metal strip having holes punched therein at longitudinally spaced locations so that holes on the core form radially extending slots on a radial face of the core, and wherein said core has the radially inner coils and the radially outer two coils fixed together by deformations thereby preventing unwinding of the core.

7 Claims, 34 Drawing Figures

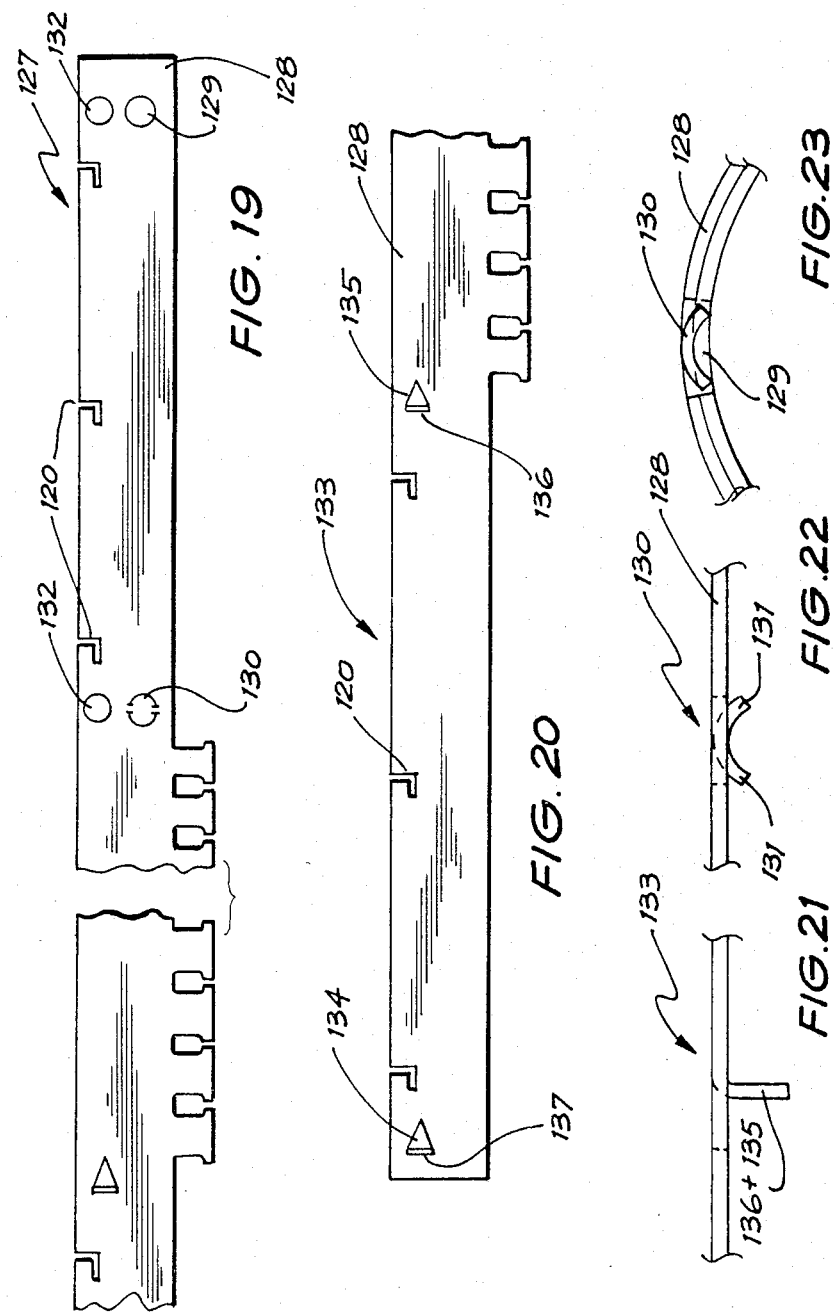

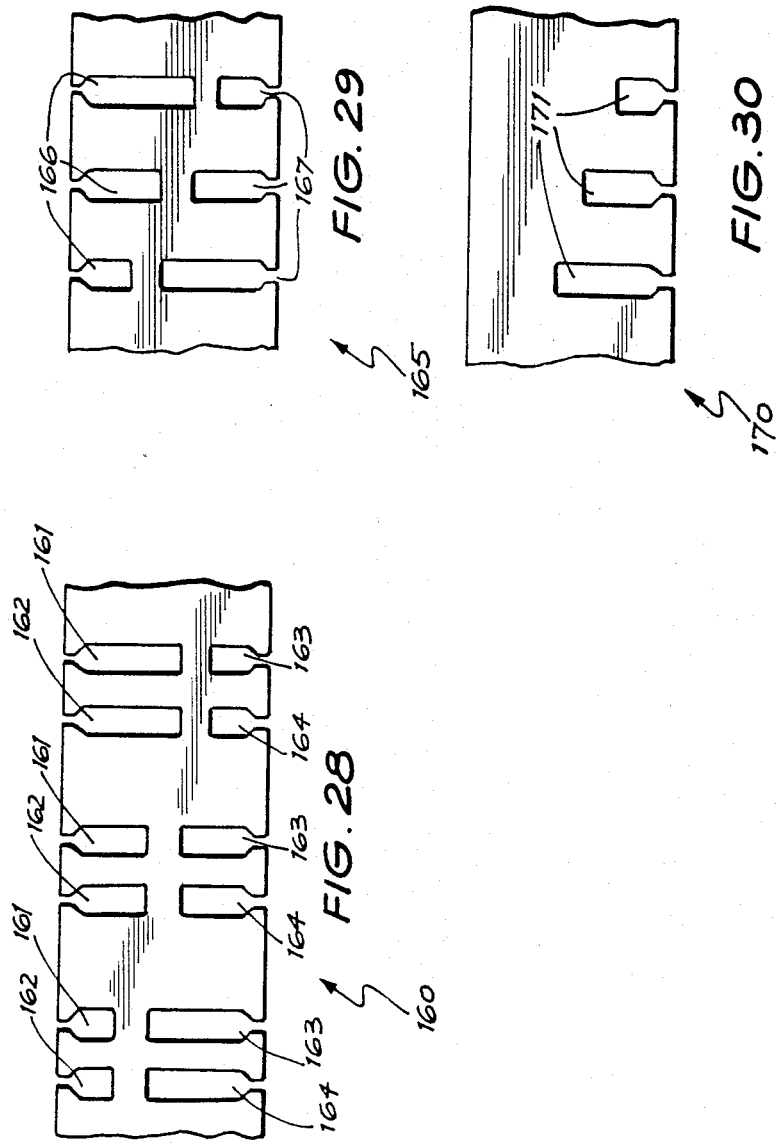

4,507,947

PUNCH AND WINDING MACHINE

The present invention relates to axial flux induction electric machines and methods and devices for the manufacture thereof.

Conventional electric motors, including induction motors, employ methods of manufacture which result in an expensive end product since these conventional methods do not lend themselves readily to automated production. Additionally motor casings employed are generally castings with the result that they are generally expensive and require labour intensive methods during assemble. Additionally conventional induction motors are generally bulky with the result that there is considerable excess metal, again resulting in unnecessary cost.

Disclosed in U.S. Pat. Nos. 4,320,645, 2,085,092, 2,356,972, 2,357,017, 2,522,238, and 3,581,389 are machines to enable the manufacture of a wound roll with slots formed in a radial face thereon, which roll may be used in the manufacture of a stator or rotor of an axial flux induction electric machine. However the devices disclosed in these patents fall short in providing a wound roll which is more accepted in an automated assembly process since the strip forming the roll unwinds if not held when removed from the winding mandrel of the machine.

It is the object of the present invention to overcome or substantially ameliorate the above disadvantages.

There is firstly disclosed herein a punch and winding machine to manufacture a core for a rotor or stator of an axial flux inducation electric machine, said core being formed of metal strip punched at longitudinally spaced locations and wound about a central axis extending transversely of the strip so that holes punched in the strip form radially extending slots in a radial face of the core, said punching and winding machines comprising a frame, a punching assembly mounted on the frame and adapted to receive said strip and punch holes therein at predetermined intervals along the strip as the strip is drawn there through, a winding assembly to receive the punched strip and wind the strip to form said core, said punching assembly including punching means to punch a first and a second deformation in a leading or trailing portion of said strip which leading or trailing portion forms a first coil or a last coil of said core, the first and second deformations being longitudinally spaced along said strip by a predetermined distance so that said first and second deformations are radially aligned on the core and interlocked to prevent unwinding of said first coil or said last coil, and control means coordinating said punching assembly and winding assembly so that the holes in said strip form radially extending slots in said core and actuation of said first punching means.

There is also disclosed herein a method of manufacturing a core for a rotor or stator of an axial flux induction electric machine, said method including the steps of punching holes in said strip at predetermined longitudinally spaced intervals along the strip, winding the strip about a central axis extending transverse of the strip so as to form said core, punching a longitudinally spaced first and second deformation in a leading or trailing portion of said strip which leading or trailing portion forms a first or last coil in said core, and coordinating said punching and winding steps so that said holes form radially extending slots on a radial face of the core, and said first and second deformations are radially aligned on the core and interlock so as to prevent unwinding of the first or last coil of the core.

There is still further disclosed herein a core for a axial flux induction electric machine, said core being formed of metal strip having holes punched therein at longitudinally spaced locations so that holes on the core form radially extending slots on a radial face of the core, said core having a first and a last coil with the first or last coil having radially aligned deformations which interlock to prevent unwinding thereof.

A preferred form of the present invention will now be described by way of example with reference to the accompanying drawings wherein:

FIG. 1 is a schematic perspective view of a punch and winding machine to manufacture a roll of punched strip;

FIG. 2 schematically depicts in side elevation the means to control alignment of the holes in the punched strip so as to provide radially extending slots;

FIG. 3 schematically depicts in side elevation a clutch and drive means for a spindle about which the roll is wound;

FIG. 4 schematically depicts in perspective view the clutch arrangement of FIG. 3;

Figure 1:
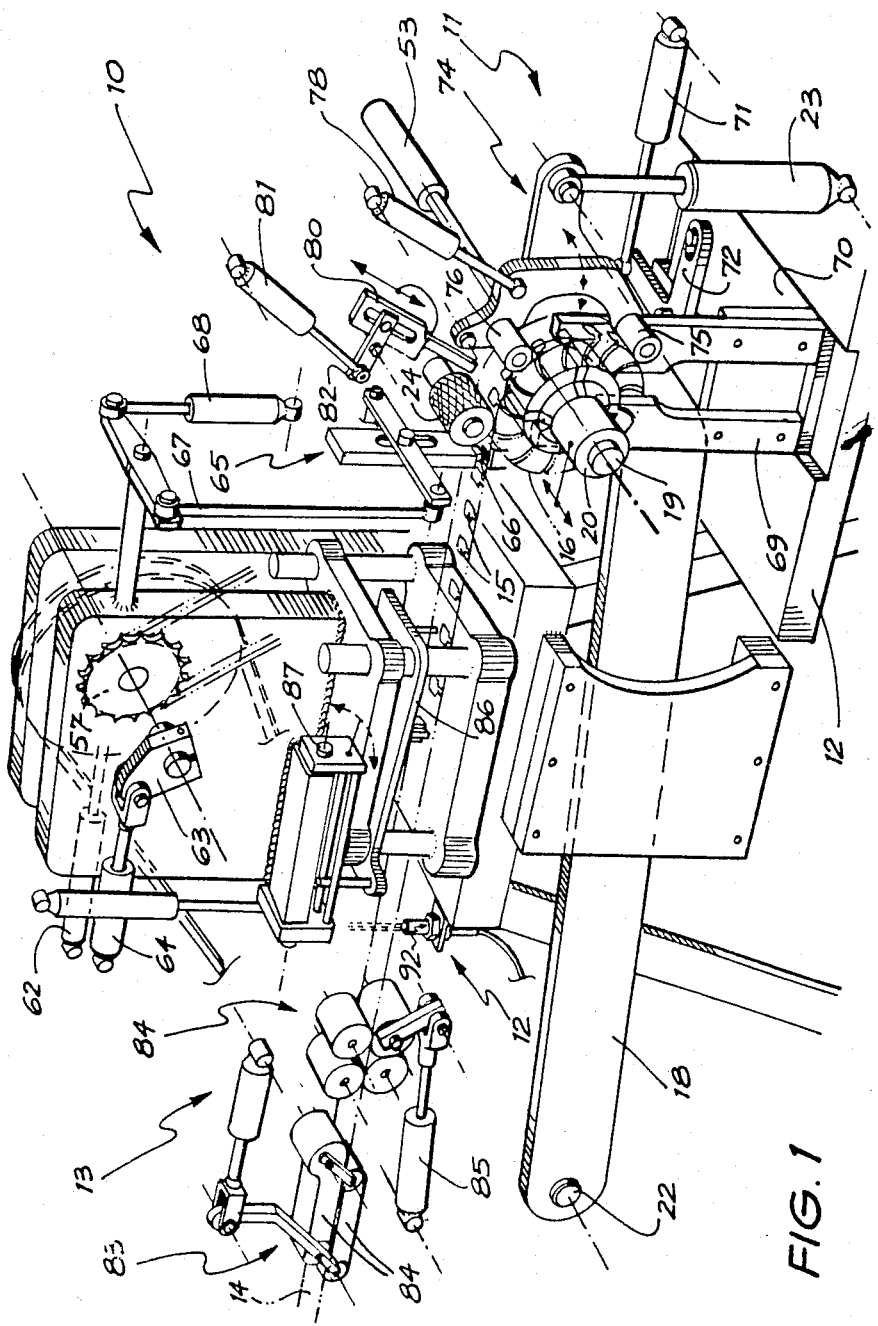
Figure 4:
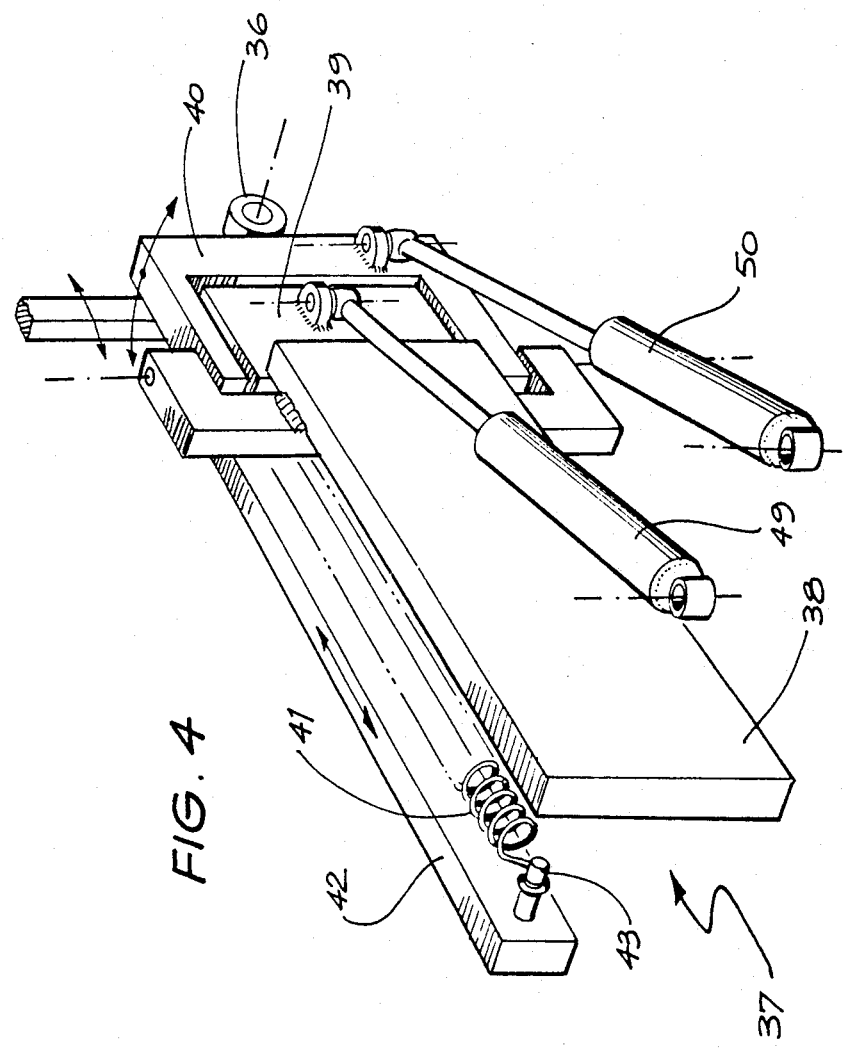
Figure 7:
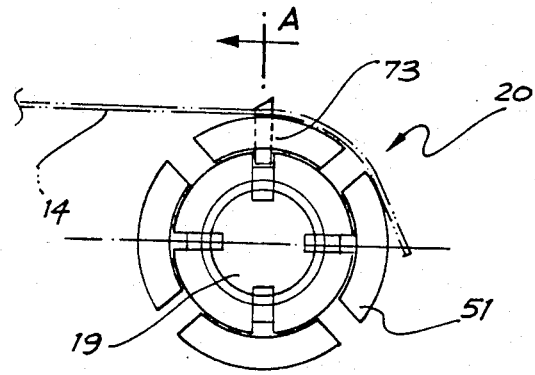
Figure 8:
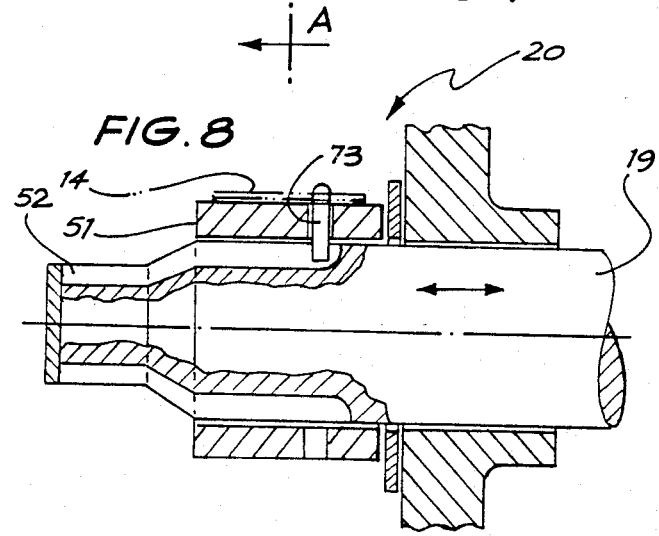
Figure 9:
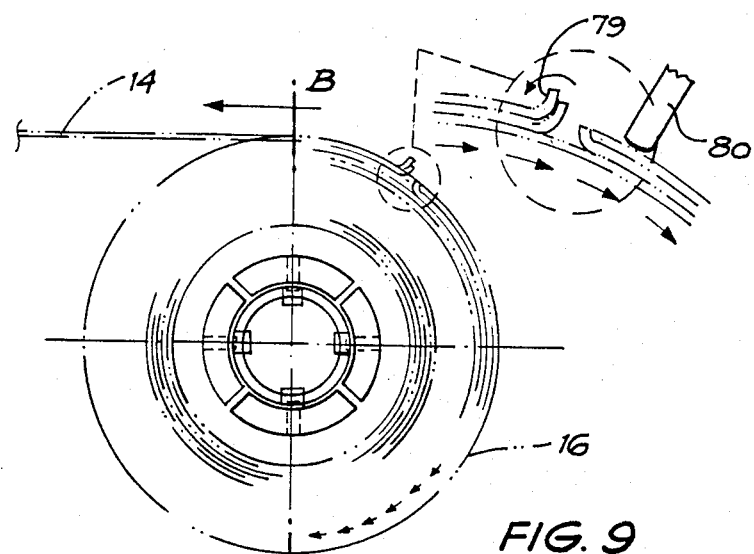
Figure 10:
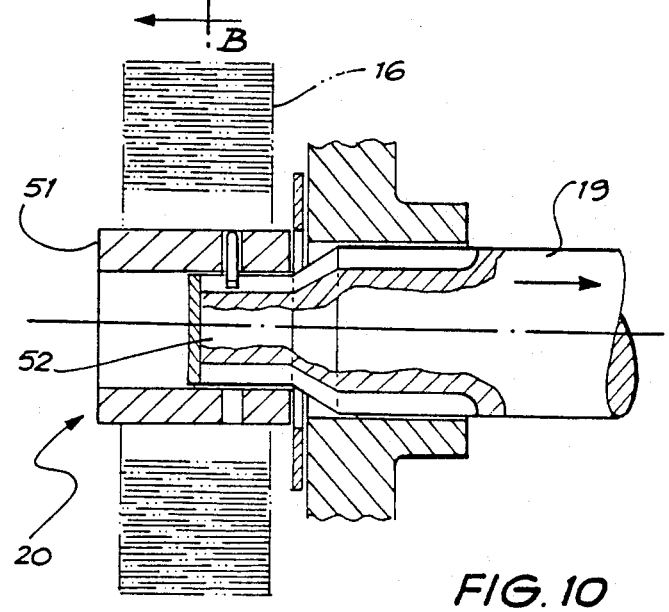
Figure 11:
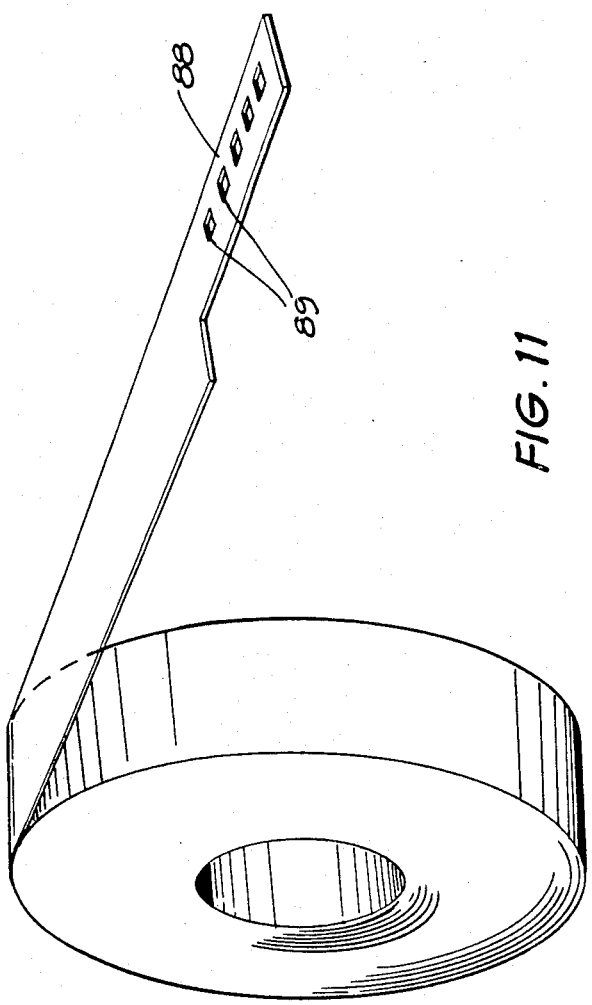
Figure 12:
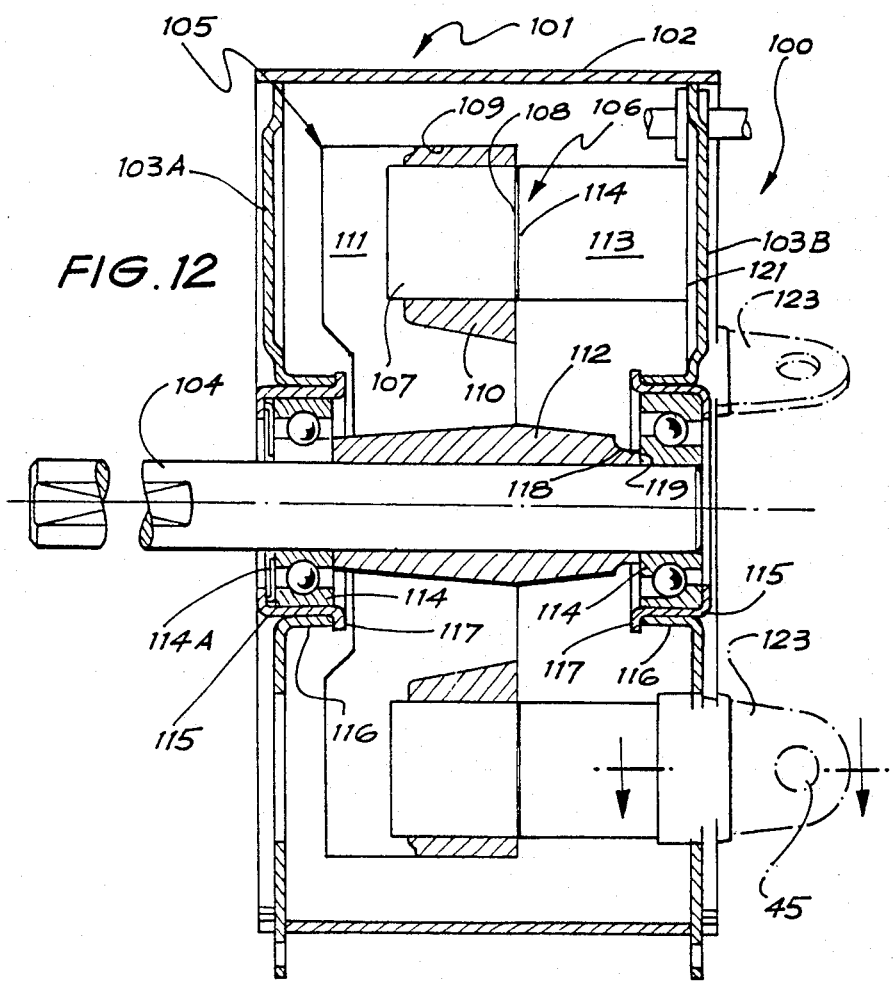
Figure 13:
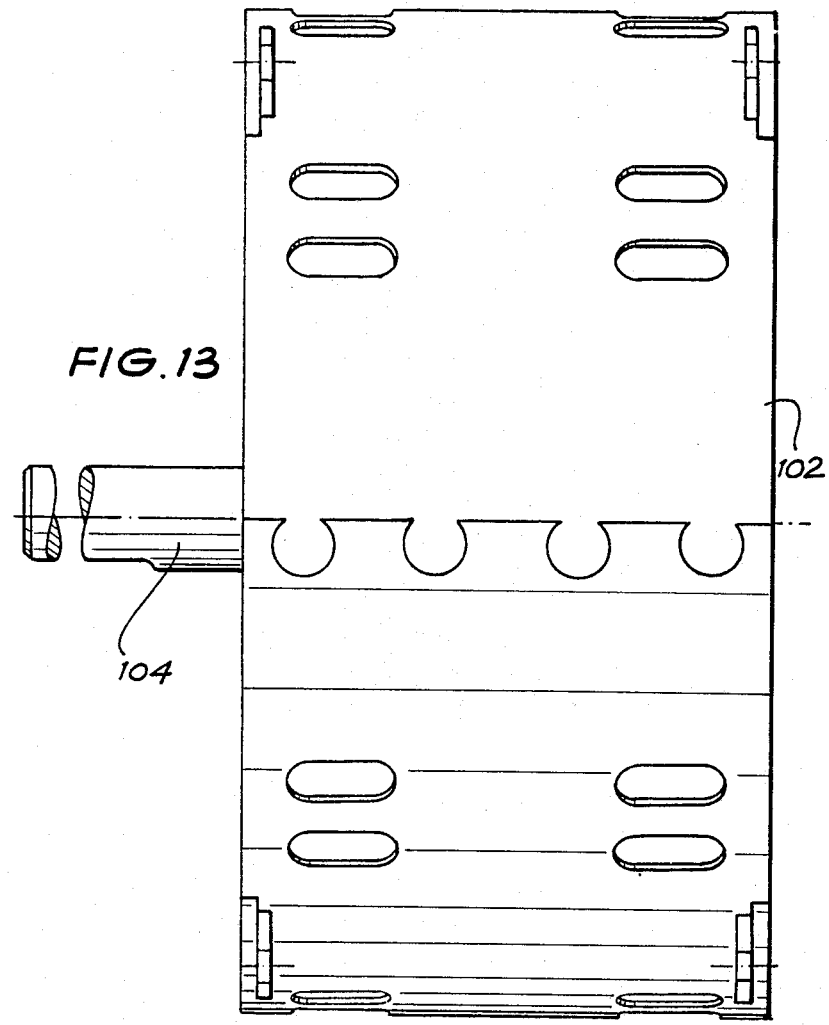
Figure 14:
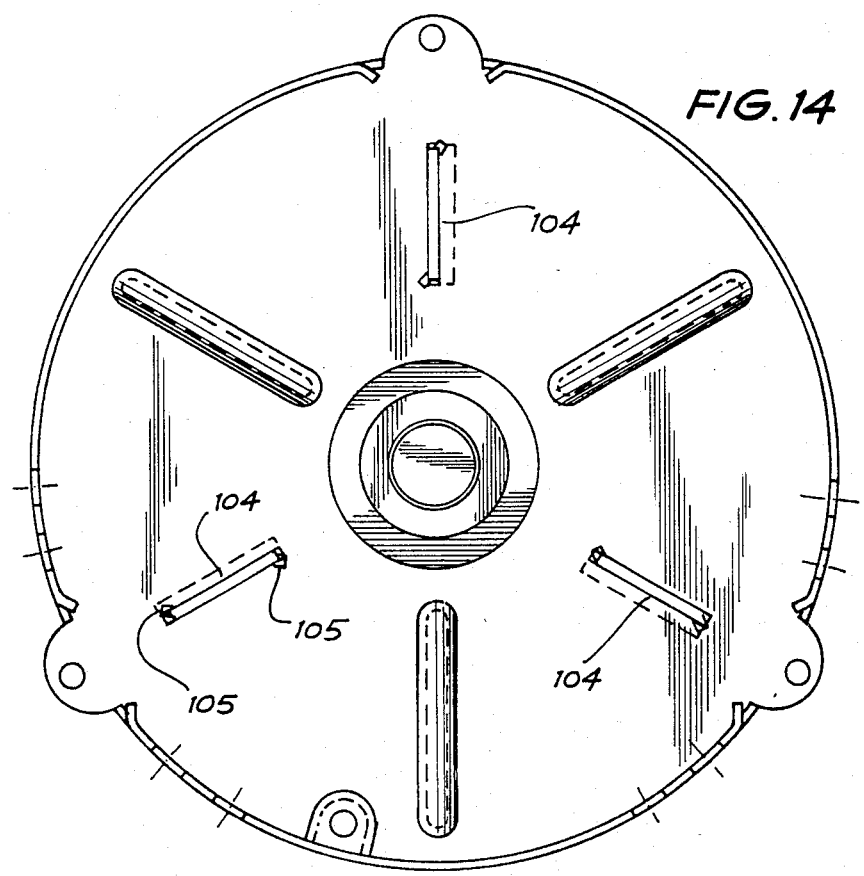
Figure 15:
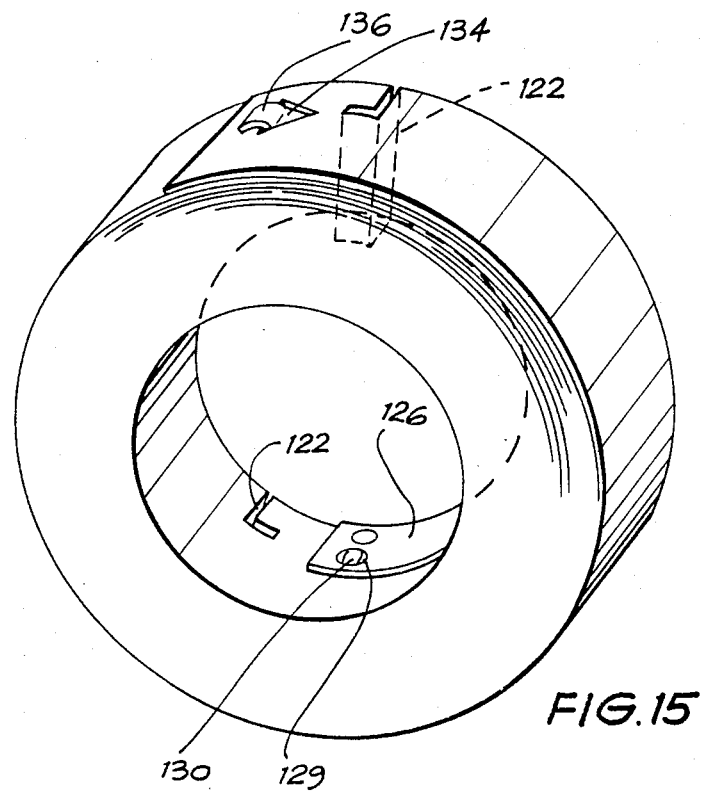
Figure 16:
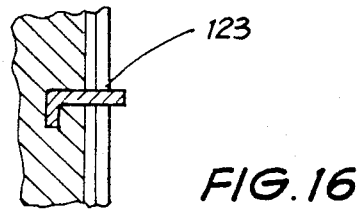
Figure 17:
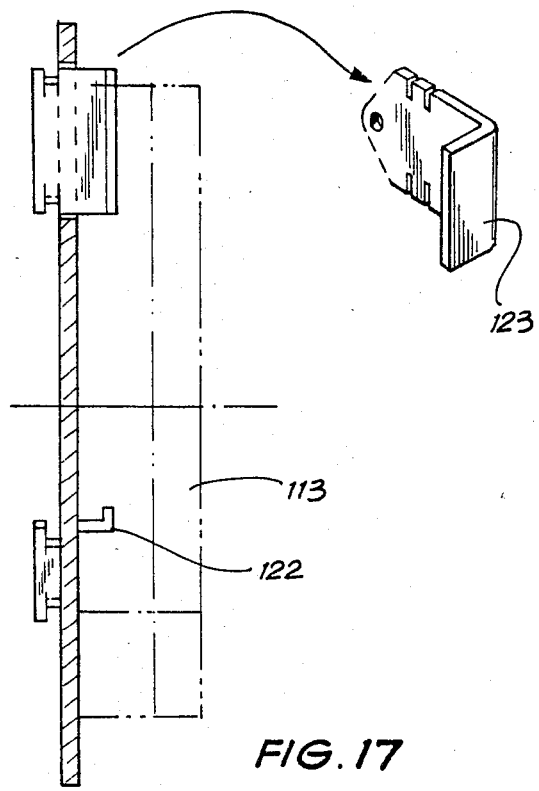
Figure 18:
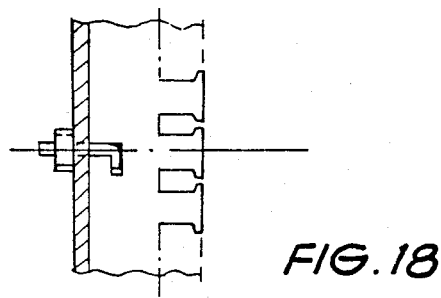
Figure 24:
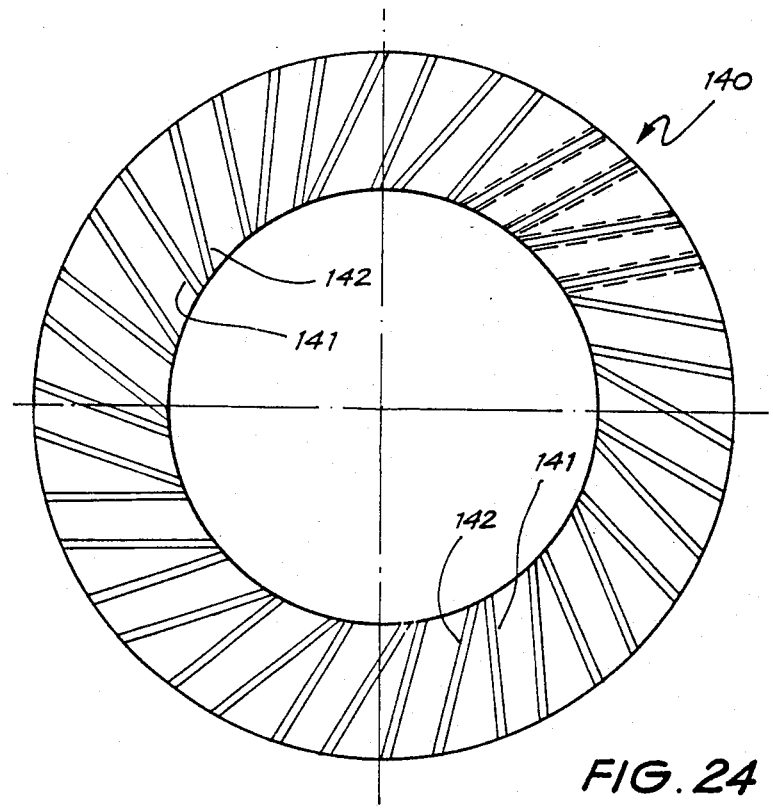
Figure 25:
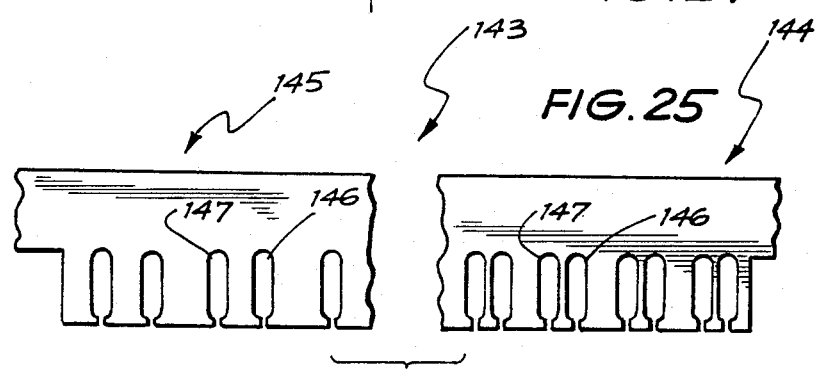
Figure 26:
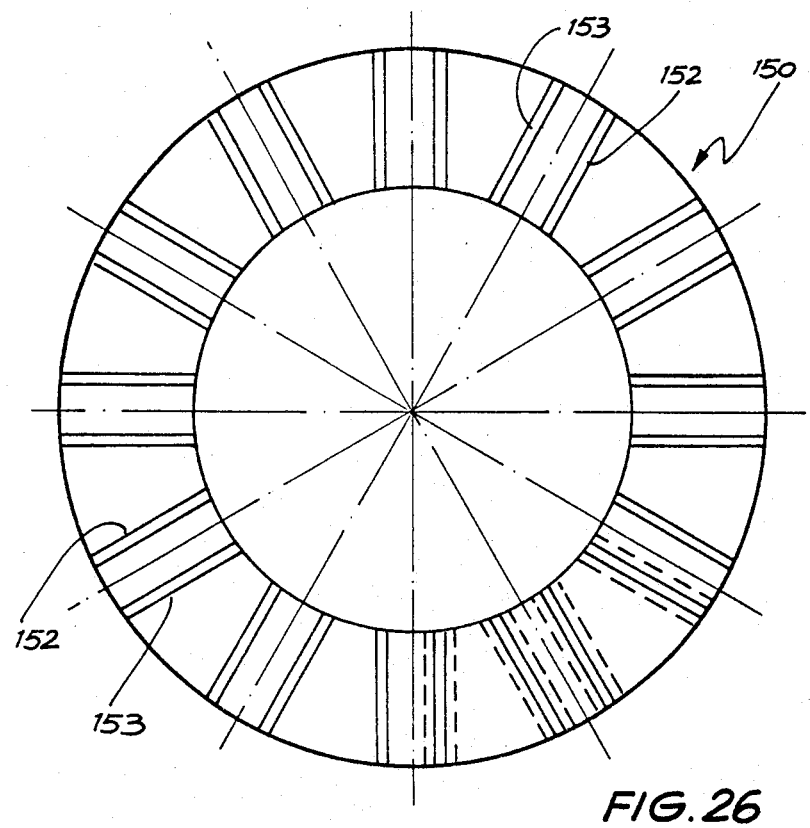
Figure 27:
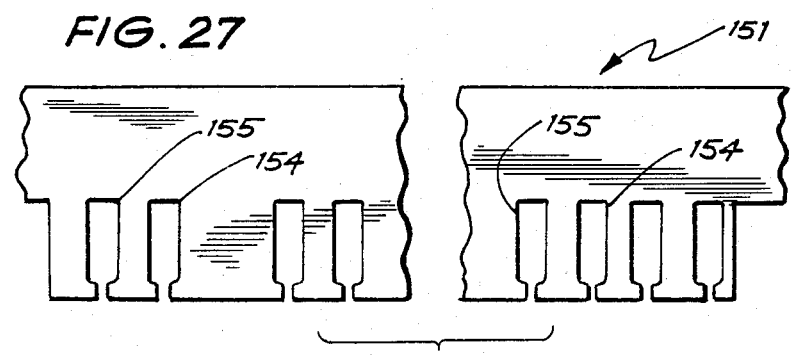
Figure 32:
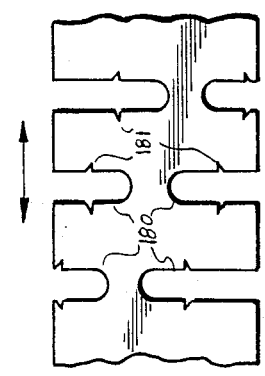
Figure 34:
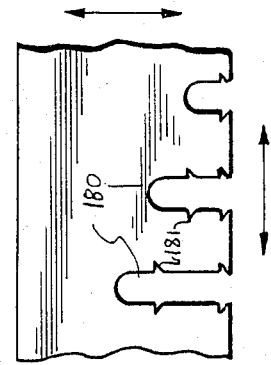
Figure 31:
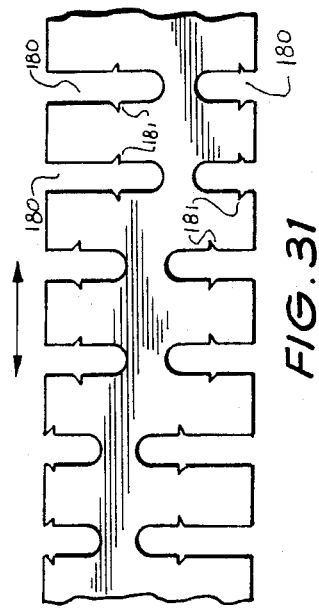
Figure 33:
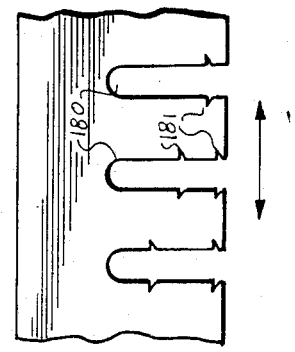

FIG. 7 schematically depicts in end elevation the spindle of the machine of FIG. 1;

FIG. 8 is a sectioned side elevation of the spindle of FIG. 7 sectioned along the line AA;

FIG. 9 schematically depicts in side elevation a roll being formed on the spindle of FIG. 7;

FIG. 10 is a sectioned side elevation of the spindle and roll of FIG. 9 sectioned along the line BB;

FIG. 11 schematically depicts in perspective view a wound roll;

FIG. 12 is a schematic sectioned side elevation of an axial flux induction electric motor;

FIG. 13 is a schematic plan view of the motor of FIG. 12;

FIG. 14 is a schematic end elevation of the motor of FIG. 12;

FIG. 15 is a schematic perspective view of a core employed in the stator of the motor of FIG. 12;

FIG. 16 schematically depicts in sectioned elevation means for adapting the core of FIG. 4 to an end plate of the motor of FIG. 12;

FIG. 17 is a schematic elevation of the means of adapting the core to the end plate of FIG. 12;

FIG. 18 is a schematic sectioned plan view of the rotor and its attachments of the casing of FIG. 17;

FIG. 19 is a schematic plan view of the stator portion of the strip employed in manufacturing cores used in the stator and rotor of FIG. 12;

FIG. 20 is a schematic plan view of an end portion of the strip employed to manufacture the stator and rotor cores of the motor of FIG. 12;

FIG. 21 is a schematic end elevation of a projection employed in the strip of FIGS. 19 and 20 to secure the strip from radial expansion;

FIGS. 22 and 23 schematically depict the first two radially inner laminations of the strip used to form the rotor and stator cores of the motor of FIG. 12;

FIG. 24 is a schematic plan view of a core for a rotor or stator of an axial flux induction electric machine;

FIG. 25 is a schematic plan view of the beginning and end portion of the strip to form the core of FIG. 24;

FIG. 26 is a schematic plan view of a further core for an axial flux induction electric machine;

FIG. 27 is a schematic plan view of a beginning and end portion of the strip to form the core of FIG. 26;

FIG. 28 is a schematic plan view of a strip to form a double sided stator or rotor of an axial flux induction electric machine with holes punched in the strips so as to form radially extending slots in both faces of the core with the slots being of varied depth;

FIG. 29 is a schematic plan view of a portion of strip to form a core of an axial flux induction machine, the strip punched at longitudinally spaced intervals with holes of varying depth so that the holes form radially extending slots in one radial face of the core with the slots being of a varied depth and arranged in pairs; and FIGS. 30 to 34 schematically depict portions of a strip to be used to form a core, as previously described, with the strip punched with additional deformations to form secondary slots which are positioned to engage insulation material to surround the field windings when the core is used to form a stator of an electric motor.

The punching machine 10 of FIG. 1 has a winding assembly 11, a punching assembly 12 and a strip feed assembly 13. In operation of the machine 10, the metal strip 14 is feed to the punching assembly 12 whereat a series of holes 15 are punched in the strip 14. Thereafter the strip 14 is wound into a core 16 by the winding assembly 11.

The winding assembly 11 includes a drive 17 (see FIG. 3) which causes intermittent rotation of the shaft 19 upon which the core 16 is mounted by means of a mandrel 20.

Figure 2:
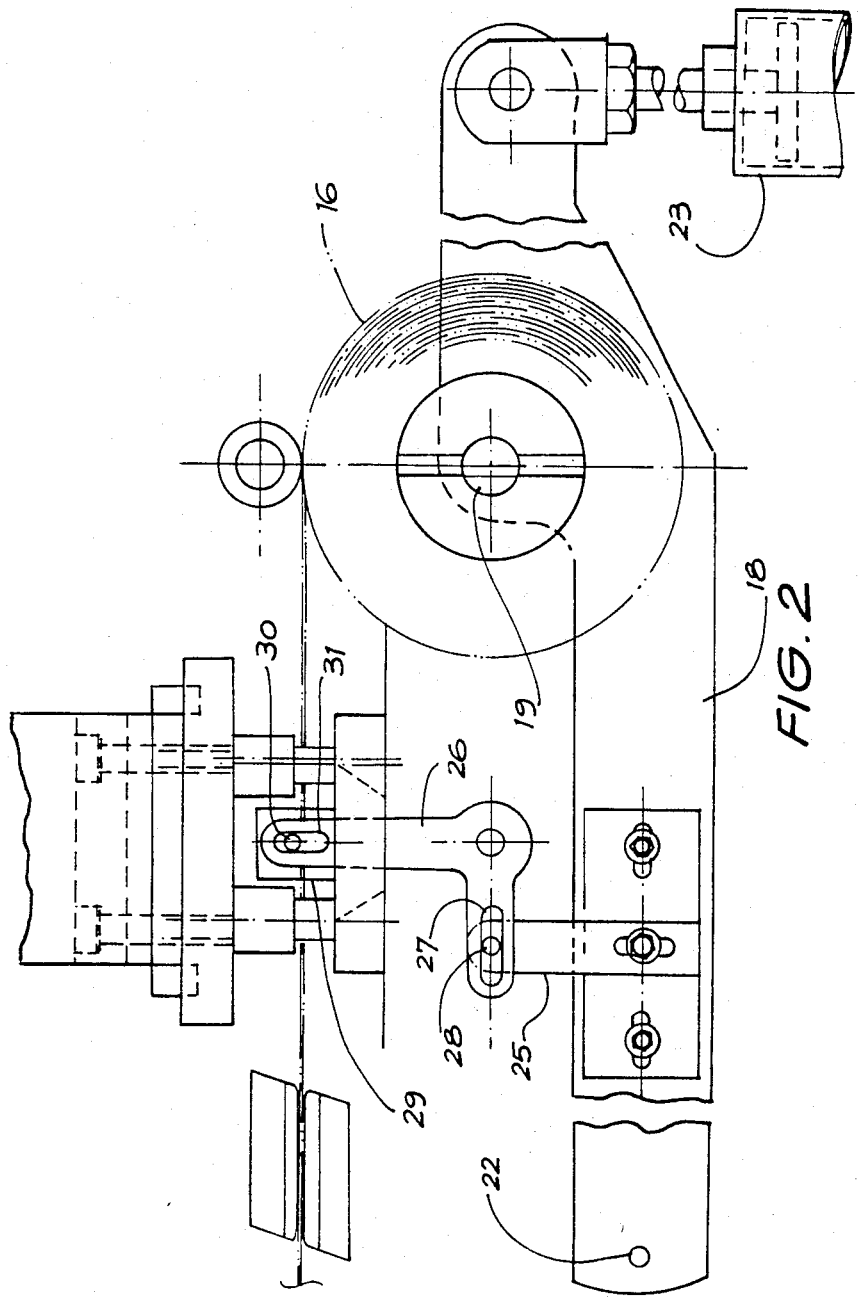
Figure 3:
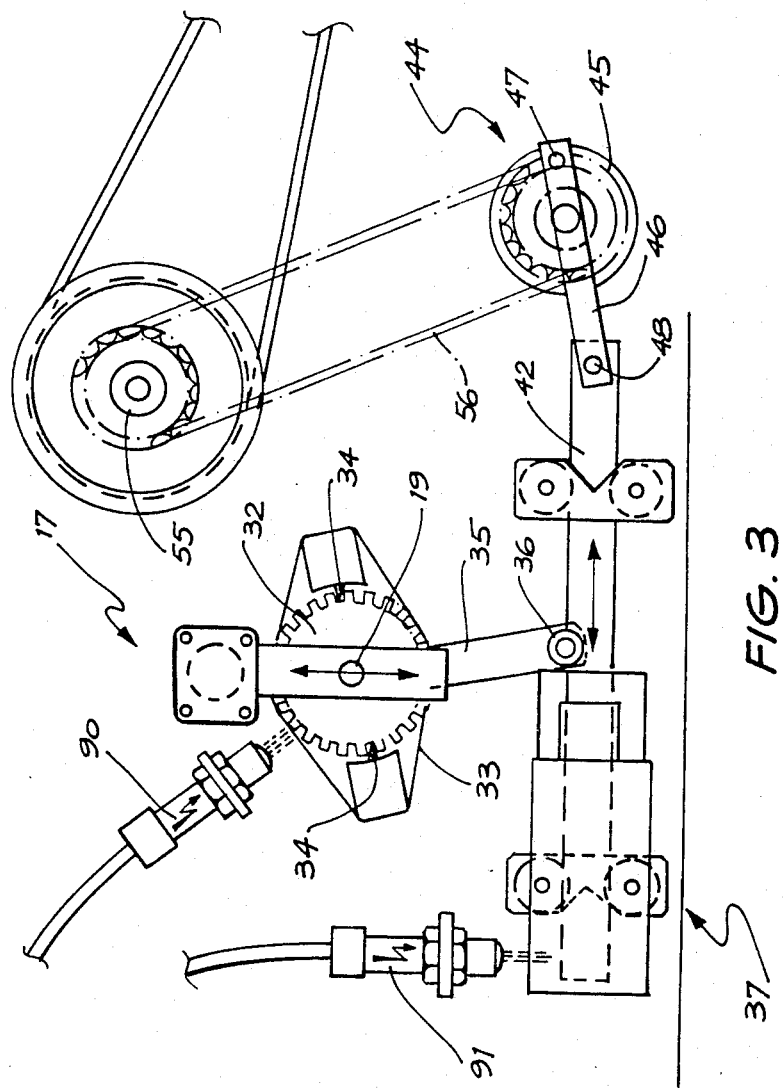

Now with reference also to FIGS. 2 and 3, there is schematically depicted the shaft 19 mounted on a lever 18 which is pivotally attached to the frame 21 by means of a pin 22. At the other end of the lever 18 there is provided a ram 24 which is either hydraulic or air operated so as to bias the lever 18 in an anticlockwise direction. Mounted above the core 16 is an abutment 23 in the form of a roller which engages the peripheral surface of the core. Accordingly the ram 23 causes the core 16 to contact the abutment 23 with a predetermined force which is substantially constant as the increase in the weight of the core 16 is negligible as compared with the force applied by the lever 22 to the ram 23. This contact force between the abutment 24 and core 16 aids in maintaining the tension in the strip 14 substantially constant. Additionally as the core increases in diameter during its winding, the core 16 is caused to move downward due to its contact with the abutment 24 and thus cause anticlockwise movement of the lever 18 against the force applied thereto by the ram 23.

Adjustably attached to the lever 18 is a linkage 25 which engages an L-shaped arm 26 pivotally mounted on the frame 21. The arm 26 is provided with a slot 27 within which a pin 28 fixed to the linkage 25 is slidably received. Accordingly upon anticlockwise rotation of the lever 18 the arm 26 is caused to rotate anticlockwise.

The punching assembly 12 includes a movable male and female die 29 which are guidably slidably mounted on the frame 21 so as to move longitudinally of the strip 14. The dies 29 are provided with a pin 30 which is received within a slot 31 formed in the arm 26. Accordingly, upon rotation of the arm 26 the dies 29 are caused to move longitudinally of the strip 14. More particularly as the diameter of the core 16 increases the dies 29 are caused to move along the strip 14 in a direction away from the core 16.

Now with particular reference to FIG. 3 wherein there is depicted the shaft 19 fixed to a ratchet 32. The ratchet 32 is engaged by a pawl member 33 having two teeth er which are resiliently biased to engage the teeth of the ratchet 32. Fixed to the pawl member 33 is a lever 35 which has at one end a roller 36. The drive assembly 17 further includes a clutch arrangement 37 which is also depicted in FIG. 4. The clutch arrangement 17 includes a mounting 38 upon which is pivotally attached two clutch engagement members 39 and 40. The engagement members 39 and 40 are each independently movable from an engaged position with the roller 36 to a position allowing free movement of the roller 36. Extending from the lever 35 is a spring or other resilient elongated member 41 having one end attached to a drive bar 42 by means of a pin 43. The drive bar 42 extends to a crank mechanism 44 which includes a primary drive sprocket 45 to engage the drive bar 42 by means of a crank lever 46 and an eccentrically mounted pin 47. The drive bar 42 is attached to the crank lever 46 by means of a pin 48 allowing relative rotation between the crank lever 46 and drive bar 42. In operation of the drive assembly 17 the sprocket 45 is caused to rotate causing linear oscillation of the drive bar 42. This oscillating movement of the drive bar 42 is transferred to the lever 35 by means of the spring 41 thereby causing angular oscillation of the lever 35. Additionally this angular oscillation of the lever 35 is transferred to the shaft 19 by means of the pawl member 33 and ratched 32. Accordingly the shaft 19 will rotate intermittently in a predetermined singular direction. This predetermined intermittent rotation of the shaft 19 causes intermittent rotation of the core 16.

If it is desirable to cease rotation of the core 16 then the clutch arrangement 37 is actuated by causing the engagement member 40 to contact the roller 36. Thereafter the lever 35 ceases to oscillate and the relative movement between the drive bar 42 and lever 35 is compensated for by extension of the spring 41. Additionally to minimise wear and noise the engagement member 40 is caused to engage the roller 36 at one extreme end of its path of travel. Additionally if it is required to change the distance of movement of the lever 35, and therefore the feed rate of the strip 14, then the engagement member 39 is caused to contact the roller 36 to limit movement of the lever 35. The engagement members 39 and 40 are pivotally moved by means of rams 49 and 50.

Now with reference to FIGS. 7 to 10 wherein there is schematically depicted the mandrel 20 about which is wound the core 16. To enable the core 16 to be easily removed from the mandrel 20, the mandrel 20 is manufactured so as to be radially expandable and contractable. As for example in FIG. 8 the strip 14 is depicted as engaging the mandrel 20 at a position determining the inside diameter of the core 16. However, as can be seen from FIG. 10 when the core 16 is to be removed from the mandrel 20 the effective diameter of the mandrel 20 is decreased. The mandrel 20 is formed of a plurality of segments 51 which are biased radially inwardly relative to the shaft 19. Additionally the shaft is stepped at one end so as to have a smaller diameter portion 52. Upon the core 16 being completed the shaft 19 is moved relative to the segments 51 such that they move to a position (as depicted in FIG. 10) contacting the smaller diameter portion 52 thereby effectively decreasing the diameter of the mandrel 20. This relative movement between the shaft 19 and segments 51 is effected by means of the ram 52 which causes sliding movement of the shaft 19 relative to the frame 12.

Figure 5:
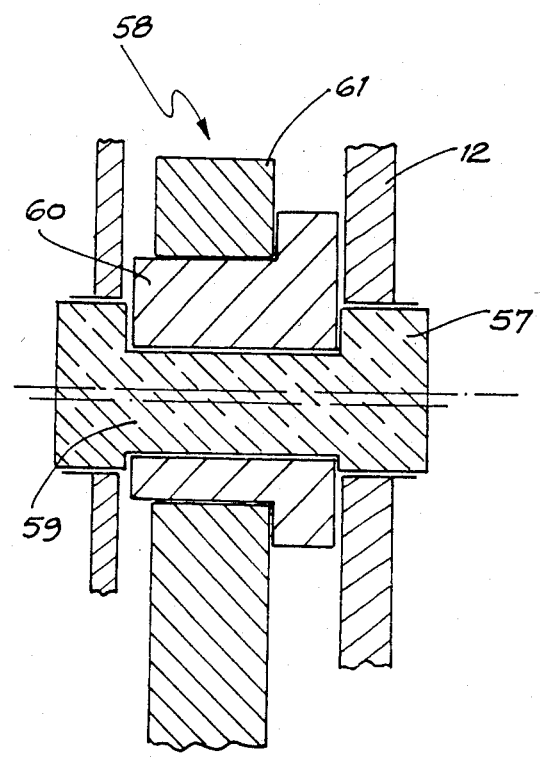
FIG. 5 is a sectioned side elevation of a portion of the punch drive for the punch portion of the machine of FIG. 1.

Again now with reference to FIGS. 1 and 3, the punching assembly 12 is driven by means of a sprocket 55 which is coupled to the sprocket 45 by means of a chain 56. Both sprockets 45 and 55 are driven by a motor not shown. The sprocket 55 is mounted on a shaft 57 which is also depicted in FIG. 5. The shaft 57 is rotatably mounted in the frame 12 and is adapted to cause vertical oscillation of the male and female dies 29 by means of a crank arrangement 58. The crank arrangment 58 includes an eccentric portion 59 of the shaft 57 which engages a bush 60. The bus 60 is rotatable about the portion 59 and is generally cylindrical having a longitudinal axis eccentric relative to its axis of rotation about the portion 59. Rotatably engaged by the bush 60 is a crank rod 61 which engages a vertically movable plate slidably guiding the dies 29. Accordingly upon the shaft 57 rotating the crank rod 61 is caused to vertically oscillate about a predetermined point determined by the position of the bush 60. Extending from the bush 60 is a lever actuated by means of ram 62. Further movement of the above predetermined point, about which the crank rod 61 oscillates, could be governed by means of a mounting for the shaft 57. Again the mounting could have an axis of rotation eccentrix from the longitudinal axis about which the mounting could be rotated. This further mounting would be operated by means of lever 63 actuated by means of ram 64.

Figure 6:
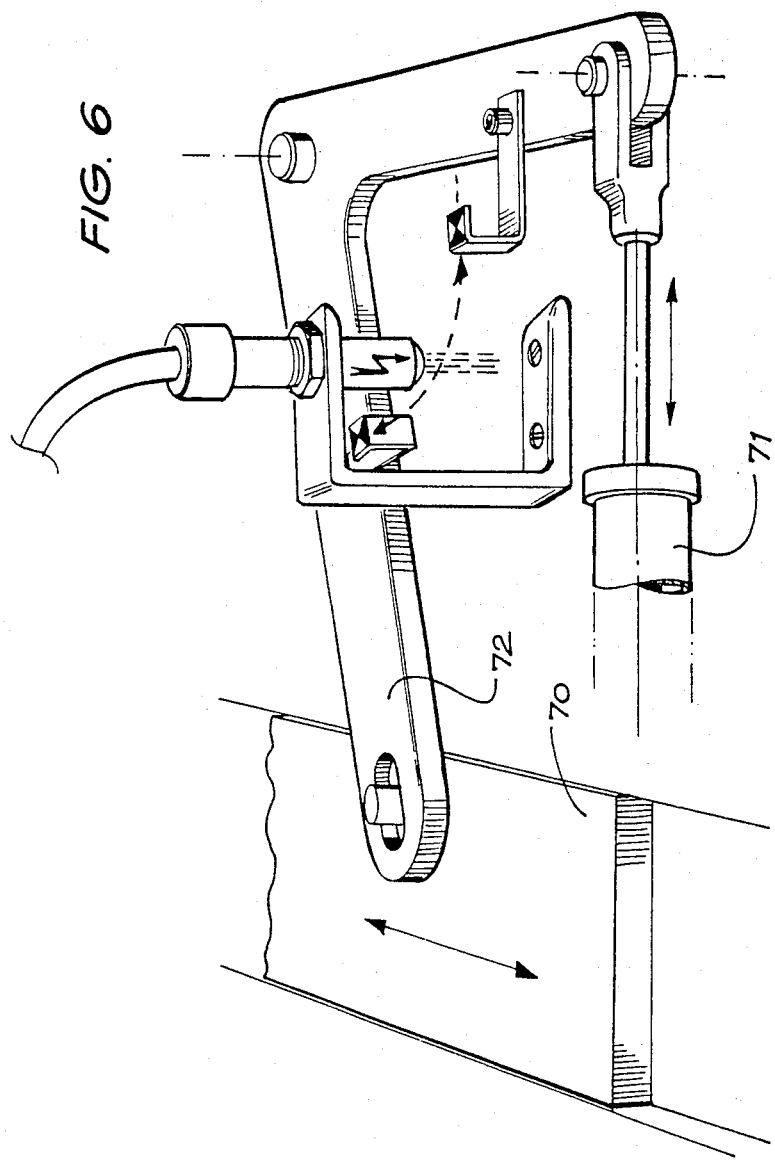
FIG. 6 is a schematic perspective view of a roll ejection arrangement to be used with the spindle about which the roll is wound.

Referring back to FIG. 1, there is included in the machine 10 a guillotine arrangement 65 having a blade 66 actuated by means of a linkage mechanism 67 extending to a ram 68. Upon the core 16 reaching a desired diameter the guillotine arrangement 65 is actuated causing severing of the strip 14. Additionally upon the core 16 being completed it is removed from the collapsed mandrel 20 by means of a fork 69 which is slidably mounted on the frame 12 so as to move generally longitudinally of the axis of the shaft 19. The fork 69 engages the back of the core 16 and pushes it off the mandrel 20. The fork 19 is attached to a slide 70 which is moved by means of a ram 71 acting through an L-shaped linkage 72. The slide 70 and linkage 72 are more fully depicted in FIG. 6.

To aid in feeding the strip 14 onto the mandrel 20 the mandrel 20 is provided with a projection 73 which engages within a hole formed in the strip 14. The projection 73 is moved radially inwardly when the mandrel 20 collapses to allow removal of the core 16. To further aid in winding of the strip 14 about the mandrel 20 there is provided a strip guide assembly 74 including two rollers 75 and 76 which are moved to contact the strip 14 as it is initially wound around the mandrel 20. The rollers 75 and 76 are mounted on a carriage 77 moved into position by means of a ram 78. When the core 16 has reached a desired diameter, the strip 14 is provided with punched tabs 79 which are nested and bent over by means of a tab engagement member 80. The tab engagement member 80 is moved to a position engaging the outer peripheral surface of the core 16 by means of a ram 81 acting through a lever arrangement 82. The tab engagement member 80 engages the outer peripheral surface of the core 16 to bend the tabs 79 over thereby preventing uncoiling of the strip 14.

The feed arrangement 13 includes a strip tension assembly 83 which includes two friction plates 84 which frictionally engage the strip 14. The friction assembly 83 in combination with with feed rate of the strip 14 and the force with which the core 16 engages the abutment 24 determines the tension in the strip 14. When a fresh strip is to be provided the beginning of the strip 14 is fed to the punching assembly 12 by means of feed rollers 84 which are caused to rotate by means of reciprocation of ram 85 to feed the strip 14 to the punching assembly 12.

The punching assembly 12 includes a selectively actuable punch which punches holes in the strip 14 to provide the tab 79, this actuable punching is moved to a punching position by means of a pivotally mounted plate 86 moved by actuator 87.

In operation of the above machine 10 a core of any diameter may be selected and one of two feed rates may also be selected. This in turn alters the frequency of punching. Different feed rates are determined by engagement of the member 39. Primarily the feed rate is determined by the diameter of the core 16 as the shaft 19 is rotated at a predetermined intermittent speed. Additionally the drive for the shaft 19 and the drive for the shaft 57 are linked so as to be co-ordinated. Still further the feed rate of the strip 14 relative to the punching assembly increases by movement of the dies 29 along the strip.

The machine 20 as mentioned above can be programmed to produce a core 16 of any desired diameter and may automatically be controlled so as to feed the strip, via the strip feed assembly 13 to the punching assembly 12. Thereafter the beginning of the strip (as illustrated in FIG. 11) is punched so as to have a narrow leading portion 88 with a plurality of holes 89. The holes 89 are being formed by the punching assembly 12 engage the projection 73 on the mandrel 20. Thereafter the rollers 75 and 76 are brought into engagement with the strip so as to hold it against the mandrel 20. At this particular stage the feed rate is relatively slow until the strip is properly mounted on the mandrel 20. Additionally the crank arrangement 58 is arranged so that the male and female die members have maximum relative movement to cause engagement of the punches to form the leading portion 88. Upon the strip 14 being correctly engaged on the mandrel 20 the feed rate changes and the depth of relative movement between the male and female die members is altered by either of or both of rams 62 and 64 so that holes 15 are manufactured.

Upon the core 16 reaching the desired diameter of a predetermined number of holes being punched, the feed rate is slowed and the selectively actuable punch brought into engagement to form two tabs 79 at correctly aligned positions. Once the tabs have passed the guillotine assembly 65 the strip is severed and the tabs bent over by the member 80 to prevent uncoiling of the core 16. In the next operation the mandrel 20 is collapsed and the core removed from the mandrel 20 by the fork 69.

The diameter of the core 16 may be determined by either counting the revolutions of the shaft 19, i.e. by means of a light sensor 90 (see FIG. 3), or by counting the number of oscillations of the drive bar 42 by means of a light sensor 91 (see FIG. 3). Additionally the beginning of the strip would be sensed by a light sensor 92 (see FIG. 1).

The winding assembly 11 and punching assembly 12 are co-ordinated by means of the lever 18 and arms 26 so as to align the punched holes on the core 16 to form radially extending grooves.

Now with reference to FIGS. 12 to 23 wherein there is schematically illustrated and axial flux indiction electric motor 20 to be manufactured by the machinery and/or method described above.

In FIG. 12 there is schematically depicted an axial flux indication electric motor 100 having a casing 101 formed of a cylindrical sidewall 102 joining two longitudinally spaced end plates 103a and 103b. The end plates 103 rotatably support the central shaft 104 to which is fixed a rotor 105 so as to be driven thereby. Fixed to the end plate 103b is a stator 106 which would be provided with field windings. The field winding would provide an axially extending rotating magnetic field which would induce a current in the rotor 105. This induced current would provide a magnetic field which opposes the magnetic field of the stator thereby causing rotation of the rotor 105 together with the shaft 104 attached thereto.

The rotor 105 includes a core 107 manufactured from metal strip. The metal strip may be manufactured by the machine and methods described in Australian Application No. 51842/79, or as described with reference to FIGS. 1 to 11.

The strip forming the core 107 is punched so as to have holes at longitudinally spaced intervals which when aligned on the core 107 provide radially extending slots in the end face 108 of the core 107. The rotor 105 further includes rotor inner and rotor outer conductive bands 109 and 110 which would be cast, preferably of aluminium, around the core 107 with radially extending rods joining the bands 109 and 110. The rods would extend through the radially extending slots in the face 108. Additionally joining the bands 109 and 110 are ribs 111 which extend to a central support 112 mounted on the shaft 104.

The stator 106 includes a core 113 formed of metal strip punched so as to have holes at longitudinally spaced locations which are aligned on the core 113 to provide radially extending slots on the end faces 114 of the core 113. Field windings would be placed on the core 113 so as to extend through the radially extending slots of the core 113. The core 113 may be manufactured in accordance with the machines and methods described in Australian Application No. 51842/79 as well as the machine and method described with reference to FIGS. 1 to 11.

The rotor 105 is supported on the shaft 104, as described previously, by means of a central support 112. However, the shaft 104 is supported in the end casings 103 means of two bearings 114 which are received within two bearing caps 115 which in turn are mounted within the annular flange 116 formed in casings 103. The bearings 114 are accurately located in their positions relative to both the casing 101 as well as rotor 105 and stator 106 since the caps 115 are provided with radially extending flanges 117 which abut the extremities of the flanges 117 of the end casings 113. Additionally one of the bearings 114 would be provided with a wave washer 118 to further aid in accuarate location. To provide for the easy and accurate location of the rotor 105 on the shaft 104, central support 112 is provided with an end portion 118 of reduced cross sectional area. In the assembly of the motor 100 the rotor 105 would be pressed on to the shaft 114 and accurately located relative to the end face 119 of the central support 112 by the plastic deferment of the portion 118.

More specifically, the shaft 104 and rotor 105 would be located in a press with the central support 112 being compressed until the face 108 of the rotor 105 engages an abuttment to prevent any further deferment of the portion 118.

Turning now to FIG. 13 wherein the sidewall 102 is more fully depicted. As can be seen from FIGS. 12 and 13 the sidewall 102 may be manufactured from a strip of metal so as to define a generally cylindrical configuration. The extremities of the strip would be provided with projections and recesses of corresponding configuration to enable interlocking of the extremities so that the strip would be retained in its generally cylindrical configuration. Additionally, the sidewall 102 would be rolled to cause plastic deformation adjacent the interlocked extremities to prevent unwinding of the strip.

Turning now to FIGS. 14 to 18 which depict a means by which the stator 106 may be fixed to the end plate 103b. Also with reference to FIGS. 19 and 20, it can be seen that the strip employed to manufacture the stator 106 may be punched so as to have "L" shaped holes 120 which are aligned on the end face 121 of the core 113 so as to define longitudinally extending slots 122 of "L" shaped transverse cross section. Secured within the slots 122 are "L" shaped brackets 123 which pass through apertures 124 formed in the end plate 103b. In manufacture, the brackets 123 would be provided with holes 125 which would be engaged within a machine which would pull the stator 113 into secure contact with the end plate 103. Thereafter the brackets 125 would be twisted so as to extend partly over the end plate 103b. This is seen in FIG. 14 wherein the portions 125 of the brackets 123 can be seen as projecting beyond the periphery of the apertures 124 to thereby secure the core 107 to the end plate 103b.

Now with reference to FIGS. 15 and 19 to 23 wherein there is schematically depicted a means by which the innermost lamination 126 of the cores 107 and 113 may be prevented from movement relative to the rest of the core. More particularly, the leading portion 127 of the punched strip 128 which is wound to form the core, is punched so as to have a hole 129 within which the deformed portion 130 is located. The hole 129 would be formed by a punch which passes through the strip 128 while the deformed portion 130 would be provided by preferably the same punch not fully pushed through the strip 128. This punch would have a shaped end so as to form projections 231 wo extend from the plane of the strip 128. The projections 131 are more clearly depicted in FIG. 22.

Accordingly when the strip 128 is wound the projections 131 are engaged within the hole 129 so as to prevent movement of the leading portion 127 from the rest of the core. Additionally the leading portion would be provided with two further holes 132 which would engage a projection on the winding mandrel.

Further with reference to FIGS. 15, 20 and 21 wherein there is schematically depicted means by which the final lamination of the cores 107 and 113 may be prevented from separation from the rest of the core. In FIGS. 20 and 21 the end portion 133 of the strip 128 is depicted. The end portion 133 is punched so as to have two holes 134 and 135 from which extend triangular shaped lugs 136 and 137. When the end portion 133 is wound to form the last lamination the projection 136 passes through the hole 134 and then subsequently both projections 136 and 137 are bent over so as to lie back along the strip 128 to prevent separation of the last lamination from the rest of the core.

Now with reference to FIGS. 28 to 30 wherein there is schematically depicted, in particular with reference to FIG. 8, a portion of a strip 160. The strip 160 is punched with a plurality of holes 161 and 162 on one side of the strip and 163 and 164 on the other side of the strip. Accordingly in this particular instance the strip 160 would be used to manufacture a double sided rotor or a double sided stator. Still further it can be noted that the holes are arranged in pairs and accordingly would form a core similar to that depicted in FIG. 26 in that the core would have parallel radially extending slots arranged in pairs. However, as a further modification the holes 161, 162, 163, and 164 are variable in depth. In the manufacture of a stator, the variable depth holes would enable the forming of variable depth slots so that field windings may be overlapped.

In FIG. 29 there is schematically depicted a strip portion 165 which again is adapted to form a double sided stator or rotor, however, in this particular instance the holes 166 and 167 are not punched in pairs however they are variable in depth as discussed with reference to FIG. 28.

In FIG. 30 there is schematically depicted a portion of a strip 170 having holes 171 with the holes 171 of variable depth. However, in this particular instance the holes are only on one side of the strip and accordingly the strip 170 could be employed to form a single sided rotor or stator.

In FIG. 24 there is depicted a core 140 which may be used to form the rotor of an axial flux induction electric machine. The core 140 is formed of punched metal strip, as discussed earlier, which is wound about the central axis of the core 140, with the holes punched in the strip being radially aligned to form radially extending slots 141 and 142. The slots 141 and 142, as can be seen from FIG. 26, are arranged in pairs so that the slots 141 and 142 diverge radially outwardly from the inner surface of the core 140. It can further be noted that adjacent slots of adjacent pairs are parallel.

The slots 141 and 142 may be formed by the interaction of two punches which cooperate with the feed rate of the strip to form the described slot configuration.

This method of forming the slots is more fully described in U.S. Pat. No. 4,320,645, as well as by the machine of FIGS. 1 to 10 hereof.

Now with reference to FIG. 25, wherein there is depicted a metal strip 143 having a start portion 144 and a finish portion 145. The strip 143 is wound so as to form the core 140 with the holes 146 and 147 aligning on the core to form the radially extending slots 141 and 142.

Now with reference to FIG. 26, wherein there is schematically depicted the core of a stator for an axial flux induction electric machine. The core 150 is formed in a similar manner to that of the core of FIG. 24, however the holes punched in the strip 151 (See FIG. 27) are arranged in pairs so as to form radially extending slots 152 and 153 which extend generally parallel.

With reference now to FIG. 27, the holes 154 and 155 are arranged in pairs so as to provide the slot configuration of FIG. 26.

The strip 151 may be punched with the holes 154 and 155 by the use of two punches which are simultaneously actuated to form the holes 154 and 155 in pairs.

It should further be appreciated that although with reference to FIGS. 25 and 27, the holes are described as being punched in pairs, it should be appreciated than any number of holes may be punched in a group. That is to say, the holes could be punched in groups of three, four or more. In the case of FIG. 26, if for example the holes were punched in sets of three, the holes would be arranged so as to form groups of three radially extending slots with the slots in each group being parallel.

Now with reference to FIGS. 31 to 34, there is schematically illustrated strip portions similar to those described with reference to FIGS. 28 to 30. However there is additionally punched on the side of the holes 180 apertures 181 which on the core form radially extending secondary slots on the internal surfaces of the major radially extending slots of the core. These additional secondary slots are adapted to engage insulation material to surround and support the field windings to be located in the radially extending slots.

It should be particularly noted that although in FIGS. 31 to 34, the slots are illustrated as being very open adjacent their neck, that the slots could be arranged so as to have a neck more in accordance with the holes depicted in FIGS. 28 to 30 in that a narrow neck portion is provided at the exit of each hole.

What I claim is:

1. A punch and winding machine to manufacture a core for a rotor or stator of an axial flux induction electric machine, said core being formed of metal strip punched at longitudinally spaced locations and wound about a central axis extending transverse of the strip so that holes punched in the strip form radially extending slots in a radial face of the core, said punch and winding machine comprising a frame, a punching assembly mounted on the frame to receive said strip and punch holes therein at predetermined intervals along the strip as the strip is drawn therethrough, a winding assembly to receive the punched strip and wind the strip to form a core, said punching assembly including punch means to punch a first and then a second deformation in a trailing portion of the strip, which trailing portion forms a last coil of the core, said first deformation being a first securing tab and said second deformation being a first securing hole, control means coordinating said punch assembly and winding assembly so that the slot holes in said strip form radially extending slots in said core and actuation of said first punching means so that the first and second deformations are longitudinally spaced along said strip by a predetermined distance to thereby radially align said securing tab with said securing hole so as to pass therethrough, and securing tab deformation means to engage said securing tab as it projects through said securing hole, to bend said securing tab back along the strip to thereby bind together the two radially outer coils of the core to inhibit relative movement therebetween.

2. The machine of claim 1 wherein said punching means includes second punch means, and said control means actuates said second punch means to punch a securing tab in said strip to form said first deformation in said strip trailing portion, and further actuates said second punch means to punch a second securing tab in said strip trailing portion forming the second deformation, and said control means controlling said control means to locate the securing tabs so that one tab will be located to pass through a hole in the strip resulting from the formation of the other securing tab, and said machine further includes securing tab deformation means for engaging said securing tabs to bend the securing tabs back along the strip thereby binding together the two radially outer coils of the core.

3. The machine of claim 1 wherein said winding assembly includes a winding mandrel rotatable about the longitudinal axis of the core and about which the core is wound, and wherein said mandrel has a peripheral surface which is radially expandable and retractable, and said control means includes mandrel actuating means to expand said peripheral surface to receive said strip and to retract said peripheral surface to allow withdrawal of a formed core from the mandrel.

4. The machine of claim 3 wherein said punching assembly punches a feed hole in a leading portion of said strip, and said mandrel includes a projection to engage said hole in said leading portion of said strip so as to engage said strip and wind the strip into said core, and said machine further includes guide means movable from a retracted position to a strip engaging position to engage the leading portion of said strip so as to cause engagement of the hole in said leading portion with said projection.

5. The machine of claim 1 wherein said first punch means punches a second securing tab in said trailing portion to form said second deformation, and said securing tab deformation means also bends said second securing tab back along the strip with said first securing tab.

6. The machine of claim 1 wherein said punching assembly includes second punch means, and said control means actuates said second punch means to punch a second securing hole in said strip to form a first deformation in said leading portion, and further actuates said second punch means to punch a projection in said strip leading portion forming a second deformation, in said strip leading portion, with said projection engageable in said second securing hole to inhibit relative movement between the first two coils of said core.

7. The machine of claim 6 wherein said first deformation in said strip leading portion is of circular configuration, and said second deformation in said strip leading portion is two arcuate projections which cooperate with said first deformation in said strip leading portion.

* * * * *